United States Patent
Rault et al.

(10) Patent No.: US 7,408,989 B2
(45) Date of Patent: Aug. 5, 2008

(54) METHOD OF VIDEO ENCODING USING WINDOWS AND SYSTEM THEREOF

(75) Inventors: Patrick Rault, Toronto (CA); Zhihua Zeng, North York (CA)

(73) Assignee: ViX5 Systems Inc, Toronto, Ontario (CA)

( * ) Notice: Subject to any disclaimer, the term of this patent is extended or adjusted under 35 U.S.C. 154(b) by 1067 days.

(21) Appl. No.: 10/345,847

(22) Filed: Jan. 16, 2003

(65) Prior Publication Data

US 2004/0141556 A1     Jul. 22, 2004

(51) Int. Cl.
H04B 1/66     (2006.01)

(52) U.S. Cl. .................. 375/240.16; 375/240.12; 375/240.15; 375/240.14; 348/699; 348/700; 382/236; 382/238; 382/239; 382/232

(58) Field of Classification Search ............ 375/240.16, 375/240.12, 240.15, 240.14; 348/699, 700; 382/236, 238, 232, 239
See application file for complete search history.

(56) References Cited

U.S. PATENT DOCUMENTS

| | | | |
|---|---|---|---|
| 4,866,395 A | 9/1989 | Hosteller | |
| 5,027,203 A | 6/1991 | Samad et al. | |
| 5,093,847 A | 3/1992 | Cheng | |
| 5,115,812 A | 5/1992 | Sano et al. | |
| 5,162,907 A * | 11/1992 | Keating et al. | 375/240.16 |
| 5,253,056 A | 10/1993 | Puri | |
| 5,475,434 A | 12/1995 | Kim | |
| 5,557,341 A * | 9/1996 | Weiss et al. | 348/699 |
| 5,563,950 A | 10/1996 | Easter et al. | |
| 5,602,589 A | 2/1997 | Vishwanath et al. | |
| 5,635,985 A | 6/1997 | Boyce et al. | |
| 5,644,361 A | 7/1997 | Ran et al. | |
| 5,652,749 A | 7/1997 | Davenport et al. | |

(Continued)

FOREIGN PATENT DOCUMENTS

EP     0661826 A2     7/1995

(Continued)

OTHER PUBLICATIONS

Yu, Donghoom, et al., "Fast Motion Estimation for Shape Coding in MPEG-4," IEEE Transactions on Circuits and Systems for Video Technology, vol. 13, No. 4, 2003 IEEE, Apr. 2003, pp. 358-363.

(Continued)

Primary Examiner—Shawn An

(57) ABSTRACT

A first search window within a reference frame of video data is identified along with a first correlation threshold value for the first window. The first correlation threshold value is a value to which correlation factors between a pixel set being encoded and pixels sets of the first search window are compared. For example, if a correlation factor between a specific pixel set of the first search window and a pixel set being encoded meets the first threshold value, a successful match between the two pixel sets has been found, and a corresponding motion vector can be assigned to the pixel set being encoded. If none of the pixel sets within the first window meet the first threshold value, a second search window within the first frame is selected along with a second correlation threshold value. The correlation factors for pixel sets in the second window are compared to the second correlation threshold value.

20 Claims, 3 Drawing Sheets

U.S. PATENT DOCUMENTS

| | | | |
|---|---|---|---|
| 5,732,391 | A | 3/1998 | Fiocca |
| 5,737,020 | A | 4/1998 | Hall et al. |
| 5,740,028 | A | 4/1998 | Sugiyama et al. |
| 5,844,545 | A | 12/1998 | Suzuki et al. |
| 5,850,262 | A * | 12/1998 | Ibenthal et al. .......... 348/420.1 |
| 5,850,443 | A | 12/1998 | Van Oorschot et al. |
| 5,872,604 | A * | 2/1999 | Ogura ....................... 348/699 |
| 5,940,130 | A | 8/1999 | Nilsson et al. |
| 5,996,029 | A | 11/1999 | Sugiyama et al. |
| 6,005,623 | A | 12/1999 | Takahashi et al. |
| 6,005,624 | A | 12/1999 | Vainsencher |
| 6,014,694 | A | 1/2000 | Aharoni et al. |
| 6,040,863 | A | 3/2000 | Kato |
| 6,081,295 | A | 6/2000 | Adolph et al. |
| 6,141,693 | A | 10/2000 | Perlman et al. |
| 6,144,402 | A | 11/2000 | Norsworthy et al. |
| 6,167,084 | A | 12/2000 | Wang et al. |
| 6,182,203 | B1 | 1/2001 | Simar, Jr. et al. |
| 6,215,821 | B1 | 4/2001 | Chen |
| 6,219,358 | B1 | 4/2001 | Pinder et al. |
| 6,222,886 | B1 | 4/2001 | Yogeshwar |
| 6,236,683 | B1 | 5/2001 | Mougeat et al. |
| 6,259,741 | B1 | 7/2001 | Chen et al. |
| 6,263,022 | B1 | 7/2001 | Chen et al. |
| 6,285,712 | B1 * | 9/2001 | Kondo et al. ........... 375/240.16 |
| 6,300,973 | B1 | 10/2001 | Feder et al. |
| 6,307,939 | B1 | 10/2001 | Vigarie |
| 6,314,138 | B1 | 11/2001 | Lemaguet |
| 6,323,904 | B1 | 11/2001 | Knee |
| 6,366,614 | B1 | 4/2002 | Pian et al. |
| 6,385,248 | B1 | 5/2002 | Pearlstein et al. |
| 6,438,168 | B2 | 8/2002 | Arye |
| 6,480,541 | B1 | 11/2002 | Girod et al. |
| 6,526,099 | B1 | 2/2003 | Christopoulos et al. |
| 6,549,561 | B2 | 4/2003 | Crawford |
| 6,584,509 | B2 | 6/2003 | Putzolu |
| 6,714,202 | B2 | 3/2004 | Dorrell |
| 6,724,726 | B1 | 4/2004 | Coudreuse |
| 6,748,020 | B1 | 6/2004 | Eifrig et al. |
| 2001/0026591 | A1 | 10/2001 | Keren et al. |
| 2002/0106022 | A1 | 8/2002 | Satoh et al. |
| 2002/0110193 | A1 | 8/2002 | Yoo et al. |
| 2002/0138259 | A1 | 9/2002 | Kawahara |
| 2002/0145931 | A1 | 10/2002 | Pitts |
| 2002/0196851 | A1 | 12/2002 | Lecoutre |
| 2003/0093661 | A1 | 5/2003 | Loh et al. |
| 2003/0152148 | A1 | 8/2003 | Laksono |

FOREIGN PATENT DOCUMENTS

| | | | |
|---|---|---|---|
| EP | 0739138 | A2 | 10/1996 |
| EP | 0805599 | A2 | 11/1997 |
| EP | 0855805 | A2 | 7/1998 |
| EP | 0896300 | A | 2/1999 |
| EP | 0896300 | B1 | 2/1999 |
| EP | 0901285 | A1 | 2/1999 |
| EP | 0955607 | A2 | 11/1999 |
| EP | 1032214 | A | 8/2000 |
| EP | 1032214 | A2 | 8/2000 |
| EP | 1087625 | A2 | 3/2001 |
| JP | 07-210670 | A | 8/1995 |
| WO | WO 01/95633 | A | 12/2001 |
| WO | WO 01/95633 | A2 | 12/2001 |
| WO | WO 02/080518 | A2 | 10/2002 |

OTHER PUBLICATIONS

Pyun, Jae-Young, "QoS Provisioning for Video Streaming Over IEEE 802.11 Wireless LAN," (abridged) IEEE Conferences in Consumer Electronics, Jun. 16, 2003, EE Times, Seoul, Korea, <http://eetimes.com/printableArticle?doc_id=OEG20030615S0070> retrieved Jul. 8, 2003.

Youn, Jeongnam et al., "Video Transcoding For Multiple Clients," Proceedings of the SPIE, Bellingham, VA. vol. 4067, XP008012075, pp. 76-85, University of Washington, Sealttle, WA.

Lengwehasatit, Krisda et al., "Computationally Scalable Partial Distance Based Fast Search Motion Estimation," Packet Video Corp., San Diego, California.

Takahashi, Kuniaki, et al., "Motion Vector Synthesis Algorithm for MPEG2-to-MPEG4 Transcoder," Proceedings of the SPIE, Bellingham, VA, vol. 4310, Sony Corporation, XP008000078, pp. 387-882, 2001 SPIE.

Soares, Luis Ducla, et al., "Influence of Encoder Parameters on the Decoded Video Quality for MPEG-4 Over W-CDMA Mobile Networks," NTT DoCoMo, Inc.

Aggarwal, Manoj et al., "Efficient Huffman Decoding," 2000 IEEE, 0-7803-6297-7, pp. 936-939, University of Illinois at Urbana-Champaign, Urbana, IL.

Sherwood, P. Greg et al., "Efficient Image and Channel Coding for Wireless Packet Networks," University of California, La Jolla, California.

Assuncao, Pedro et al., "Rate Reduction Techniques for MPEG-2 Video Bit Streams," SPIE, vol. 2952, Apr. 1996, pp. 450-459, University of Essex, Colchester, England.

Yin, Peng et al., "Video Transcoding by Reducing Spatial Resolution," Princeton University, 2000, Princeton, New Jersey.

Shanableh, Tamer et al., "Heterogeneous Video Transcoding to Lower Spatio-Temporal Resolutions and Difference Encoding Formats," IEEE Transactions on Multimedia, vol. 2, No. 2, Jun. 2000, pp. 101-110, Engineering and Physical Sciences Researc Counsel, Colchester, U.K.

Wiegand, Thomas et al., "Long-Term Memory Motion-Compensated Prediction for Rubust Video Transmittion," In Proc. ICIP 2000, University of Erlangen-Buremberg, Erlangen, Germany.

Fan, Zhigang et al. "Maximum Likelihood Estimation of JPEG Quantization Table in the Identification of Bitmap Compression History," Xerox Corporation, Webster, New York.

Thomas, Shine M. et al., "An Efficient Implentation of MPEG-2 (BC1) Layer 1 & Layer 2 Stereo Encoder on Pentium-III Platform", pp. 1-10, Sasken Communication Technologies Limited, Bangalore, India.

Ramanujan, Ranga S. et al., "Adaptive Streaming of MPEG Video Over IP Networks," 22nd IEEE Conference on Local Computer Networks (LCN '97), Nov. 2-5, 1997, 1997 IEEE, pp. 398-409, Architecture Technology Corporation, Minneapolis, MN.

Rejaie, Reza et al., "Architectural Considerations for Playback of Quality Adaptive Video Over the Internet," XP002177090, 2000 IEEE pp. 204-209, AT&T Labs, Menlo Park, California.

Bouras, C. et al., "On-Demand Hypermedia/Multimedia Service Over Broadband Networks," XP-002180545, 1996 IEEE Proceedings of HPDC-5 '96, pp. 224-230, University of Patras, Patras, Greece.

Chalidabhongse, Junavit et al., "Fast Motion Vector Estimation Using Multiresolution-Spatio-Temporal Correlations," IEEE Transactions On Circuits and Systems For Video Technology, vol. 7, No. 3 Jun. 1997, pp. 477-488.

Oh, Hwang-Seok et al., "Block-Matching Algorithm Based On An Adaptive Reduction of the Search Area For Motion Estimation," Real-Time Imaging, Academic Press Ltd., vol. 56, No. 5, Oct. 2000, pp. 407-414, XP004419498 ISSN: 1077-2014 , Taejon, Korea.

Lee, Liang-Wei et al., "Dynamic Search-Window Adjustment and Interlaced Search for Block-Matching Algorithm," IEEE Transactions On Circuits and Systems for Video Technology, IEEE, vol. 3, No. 1, Feb. 3, 1993, pp. 85-87, XP000334581 ISSN: 1051-8215, New York.

Fukunaga, Shigeru et al., "MPEG-4 Video Verification Model Version 16.0" International Organization for Standardization: Coding of Moving Pictures and Audio, vol. N3312, Mar. 2000, pp. 1-380, XP000861688.

Kroner, Sabine et al., "Edge Preserving Noise Smoothing With An Optimized Cubic Filter," DEEI, University of Trieste, Trieste, Italy.

Kim, Jaemin et al., "Spatiotemporal Adaptive 3-D Kalman Filter for Video," pp. 1-12. Samsung Semiconductor, Inc. San Jose, California.

Liu, Julia J., "ECE497KJ Course Project: Applications of Wiener Filtering In Image and Video De-Noising," pp. 1-15, May 21, 1997.

Jostschulte, K. et al., "A Subband Based Spatio-Temporal Noise Reduction Technique for Interlaced Video Signals," University Dortmund, Dortmund, Germany.

Kossentini, Faouzi et al. "Predictive RD Optimized Motion Estimation for Very Low Bit-Rate Video Coding," 1997 IEEE, XP-000726013, pp. 1752-1963, Sep. 1, 1996, 1997 International Conference on Image Processing, Vancouver, Canada.

Tourapis, Alexis et al. "New Results on Zonal Based Motion Estimation Algorithms—Advanced Predictive Diamond Zonal Search," 2001 IEEE, pp. V 183-V 186, The Hong Kong University of Science and Technology, Clear Water Bay, Kowloon, Hong Kong.

Brandenburg, Karlheinz, "MP3 and AAC Explained," Proceedings of AES 17th International Conference, XP008004053, pp. 99-110, Erlangen, Germany.

Painter, Ted et al., "Perceptual Coding of Digital Audio," Proceedings of the IEEE, vol. 88, No. 4, Apr. 2000, pp. 451-513, XP001143231, ISSN: 0018-9219, Arizona State University, Tempe, AZ.

Hassanzadegan, Hooman et al., "A New Method for Clock Recovery in MPEG Decoders," pp. 1-8, Basamad Negar Company, Tehran, Iran.

Kan, Kou-Sou et al., "Low-Complexity and Low-Delay Video Transcoding for Compressed MPEG-2 Bitstream," Natinal Central University, Chung-Li, Taiwan.

Mitchell et al., "MPEG Video Compression Standard: 15.2 Encorder and Decorder Buffering," Chapman and Hall Digital Multimedia Standards Series, pp. 340-356, XP002115299, ISBN: 0-412-08771-5, Chapman and Hall, New York.

Whybray, M.W. et al., "Video Coding—Techniques, Standards and Applications," BT Technol J. vol. 14, No. 4, Oct. 4, 1997, pp. 86-100, XP000722036.

"Sharp Product Information: VTST-Series NTSC/PAL Electronic Television Tuners," RF Components Group, Sharp Microelectronics of the America, 1997.

Edwards, Larry M., "Satisfying Your Need for Net Speed," San Diego Metropolitan, Sep. 1999, <<www.sandiegometro.com/1999/sept/speed.html>>, retrieved on Jul. 19, 2001.

Oz, Ran et al., "Unified Headend Technical Management of Digital Services," BigBend Networks, Inc.

Muriel, Chris, "What is Digital Satellite Television?," What is Digital Television Rev. 3.0, Apr. 21, 1999, SatCure, Sandbach, England, <<http://www.netcentral.co.uk/satcure/digifaq.htm>>, access on Apr. 20, 2001.

"Conexant Products & Tech Info: Product Briefs: CX24108," 2000-2002 Conexant Systems, Inc. access on Apr. 20, 2001.

"Conexant Products & Tech Info: Product Briefs: CX22702," 2000-2002 Conexant Systems, Inc. access on Apr. 20, 2001.

"TDC: Components for Moderns & Digital Infotainment: Direct Broadcast Satellite Chipset," 2001 Telecom Design Communications Ltd., U.K., <<http://www.tdc.co.uk.modmulti/settop/index.htm>22, access on Apr. 20, 2001.

"White Paper: Super G: Maximizing Wireless Performance," Mar. 2004, Atheros Communications, Inc., pp. 1-20, Document No. 991-00006-001, Sunnyvale California.

Kwok, Y.K. et al., "Efficient Multiple Access Control Using a Channel-Adaptive Protocol for a Wireless ATM-Based Multimedia Services Network," Mar. 29, 2000, Computer Communications 24(2001) 970-983, University of Hong Kong, Hong Kong, PRC.

Liang, Ying-Chang et al., "Joint Downlink Beamforming, Power Control, and Data Rate Allocation for DS-CDMA Mobile Radio with Multimedia Services," 2000 IEEE, pp. 1455-1457, Ceneter for Wireless Communication, Singapore.

Razavi, Behzad, "Challenges in Portable RF Transceiver Design," Sep. 1996, 1996 IEEE, pp. 12-25, Circuits & Devices.

Mannion, Patrick, "IceFyre Device Cools 802.11a Power Consumption," Sep. 24, 2001, Planet Analog, National Semiconductor, <<http://www.planetanalog.com/story/OEG20010924S0079>>, access on Nov. 5, 2001.

"Ice Fyre Semiconductor: IceFyre 5GHz OFDM Modern Solution," Sep. 2001, pp. 1-6, IceFyre: Rethink Wireless, IceFyre Semiconductor, Inc.

Pozar, David M., "Theory and Design of Ferrimagnetic Components," 1990, pp. 529, Microwave Engineering, Addison-Wesley Publishing Company, Inc.

"Part 11: Wireless LAN Medium Access Control (MAC) and Physical Layer (PHY) Specifications: High-Speed Physical Layer in the 5 GHz Band," 1999 IEEE, pp. 1-83, Supplement to IEEE Standard fo rinformation Technology, IEEE Std 802.11a-1999, LAN/MAN Standards Committee.

Ciciora, Walter S., "Cable Television in the United States: An Overview," May 25, 1995, pp. 1-90, Cable Television Laboratories, Inc., Louisville, Colorado.

Pedro Assuncao and Mohammad Ghanbari, "Rate Reduction Techniques for MPEG-2 Video Bit Streams," SPIE vol. 2952, Apr. 1996, 10 pp.

Jae-Young Pyun, "QoS Provisioning for Video Streaming over IEEE 802.11 Wireless LAN," (abridged) IEEE Conference in Consumer Electronics, Jun. 16, 2003, 3 pp. [online] Retrieved Jul. 8, 2003 at URL <http://www.eetimes.com/printableArticle?doc_id=OEG20030612S0070>.

Krisda Lengwehasatit and Antonio Ortega, "Computationally Scalable Partial Distance Based Fast Search Motion Estimation," Univ. of Southern California, 4 pp., date unknown.

Manoj Aggarwal and Ajai Narayan, "Efficient Huffman Decoding," 2000 IEEE, 0-7803-6297-7, pp. 936-939.

Peng Yin et al., "Video Transcoding by Reducing Spatial Resolution," Princeton University, Princeton, NJ, 4 pp., 2000.

Zhigang Fan and Ricardo de Queiroz, "Maximum Likelihood Estimation of JPEG Quantization Table in the Identification of Bitmap Compression History," Xerox Corporation, Webster, NY, 4 pp. date unknown.

Luis Ducla Soares et al., "Influence of Encoder Parameters on the Decoded Video Quality for MPEG-4 Over W-CDMA Mobile Networks," NTT DoCoMo, Inc. technical paper, 4 pp. date unknown.

Thomas Wiegand et al., "Long-Term Memory Motion-Compensated Prediction for Rubust Video Transmittion," in Proc. ICIP2000, 4 pp.

P. Greg Sherwood et al., "Efficient Image and Channel Coding for Wireless Packet Networks," Univ. of CA, San Diego, CA, 4 pp. date unknown.

Donghoon Yu et al., "Fast Motion Estimation for Shape Coding in MPEG-4," 2003 IEEE Transactions on Circuits and Systems for Video Technology, vol. 13, No. 4, Apr. 2003, pp. 358-363.

Shine M. Thomas, Rahul Kumar & Vasudha Bhat, "An Efficient Implentation of MPEG-2 (BC1) Layer 1 & Layer 2 Stereo Encoder on Pentium-III Platform", Sasken Communication Technologies Limited, Banalore, India, pp. 1-10.

Oh H-S, et al., "Block-Matching Algorithm Based On An Adaptive Reduction Of The Search Area For Motion Estimation" Real-Time Imaging, Academic Press Ltd, GB, vol. 6, No. 5, Oct. 2000 pp. 407-414, XP004419498 ISSN: 1077-2014 Abstract p. 410, line 3, p. 411, right-hand column, line 2.

Liang-Wei Lee: "Dynamic Search-Window Adjustment And Interlaced Search for Block-Matching Algorithm" IEEE Transactions On Circuits And Systems For Video Technology, IEEE Inc. NY, US, vol. 3, No. 1, Feb. 1, 1993, pp. 85-87, XP000334581 ISSN: 1051-8215, the whole document.

* cited by examiner

METHOD OF VIDEO ENCODING USING WINDOWS AND SYSTEM THEREOF

FIELD OF THE DISCLOSURE

The present disclosure relates generally to video processing, and more particularly to a method and system of encoding video data.

BACKGROUND

Encoding of digital video data is generally performed in order to compress the amount of data needed to represent a video stream. It is known in the art to encode a frame one set of pixels at a time. For example, each macroblock of a frame can be encoded by comparing the macroblock's pixels to the pixels of other macroblocks of a frame that has been previously displayed, or decoded. Once a set of pixels in the previous frame that corresponds closely to the set of pixels being encoded is found, a motion vector pointing to that set of pixels is identified. Once a motion vector to the set of pixels is identified, any information difference between the two sets of pixels can be quantified and efficiently compressed.

Known methods of encoding will correlate the set of pixels being encoded to sets of pixels in the previous frame or a portion of the previous frame until a correlation threshold is met. Once the correlation threshold is met, it is known that a pixel set in a previous frame that corresponds sufficiently close to the pixel set being encoded has been found. Due to the large amount of data associated with video streams, and video frames, the encoding process can be a very time-consuming process. Therefore, a system or method capable of more efficiently encoding pixels sets would be useful.

DETAILED DESCRIPTION OF THE FIGURES

In accordance with the specific embodiment of the present disclosure, a first window is selected in a reference frame of video data. The first window contains one or more pixel sets, each that are to be correlated with a pixel set being encoded to determine a correlation factor. In addition, a first threshold value is determined for the first search window. The first threshold value is the value to which correlation factors are compared. For example, if a correlation factor between a specific pixel set of the first search window and the pixel set being encoded meets the first threshold value, a successful match between the two pixel sets has been found, and a corresponding motion vector can be assigned to the pixel set being encoded.

If none of the pixel sets within the first window meet the first threshold value, a second search window within the first frame is selected. A second threshold value different than the first threshold value, is determined for the second search window. Typically, the second threshold value will be less stringent than the first threshold value. The correlation factors for the pixel sets of the second search window that are correlated to the pixel set being encoded are compared to the second threshold value. By using multiple search windows with varying threshold values, a more efficient encoding process can be obtained. For example, by setting the first search window to be relatively small, a faster match can be expected while maintaining a high correlation level. This provides a decoder system a mechanism to set a trade off between processing power of an encode process, and the desired quality of the encode process. FIGS. 1 through 4 further illustrate specific embodiments of the present disclosure.

Figure 1:
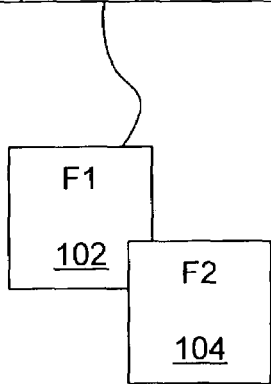
FIG. 1 illustrates, in block diagram form, the graphical representation of a reference frame of video data in accordance with the present disclosure.

FIG. 1 illustrates frames F1 102 and F2 104. Frame F1 102 represents a reference frame with respect to the frame F2 104 that is being encoded. Frame F1 102 is a reference frame in that the pixel data associated with frame F1 will be available, and used, at the time that pixel sets of frame F2 104 are being encoded or decoded. Therefore, during the encoding process each pixel set, such as a macroblock or a block, of frame F2 104 will be compared against a portion of Frame F1 102 to determine whether a substantially similar set of pixels resides within Frame F1 102. A specific embodiment of the present disclosure will be further discussed with reference to the method of FIG. 2 and frame data of FIG. 1.

At step 201 a first search window size and location is determined. For example, referring to FIG. 1, the search window 111 is defined. The search window 111 represents an area of frame F1 102 that has one or more pixel sets that will be correlated to macroblock F2/52. Note that F2/52 refers to the macroblock at macroblock location 52 in frame F2 104, which is the macroblock being encoded. It will be further appreciated, that within specific search windows, the searches are not constrained by specific pixel sets, such as macroblock boundaries. In other words, the pixel sets identified within a search window can reside across encoding pixel set boundaries. In one embodiment, the first search window 111 contains a single pixel set to be searched. In other embodiments, multiple pixel sets are contained with the first search window.

It will be appreciated that the location of the first search window is generally be based upon a predicted motion vector. It will be appreciated that there are many method of predicting motion vectors, and how the initial location of the first search window is determined can be determined by a variety of methods.

Figure 2:
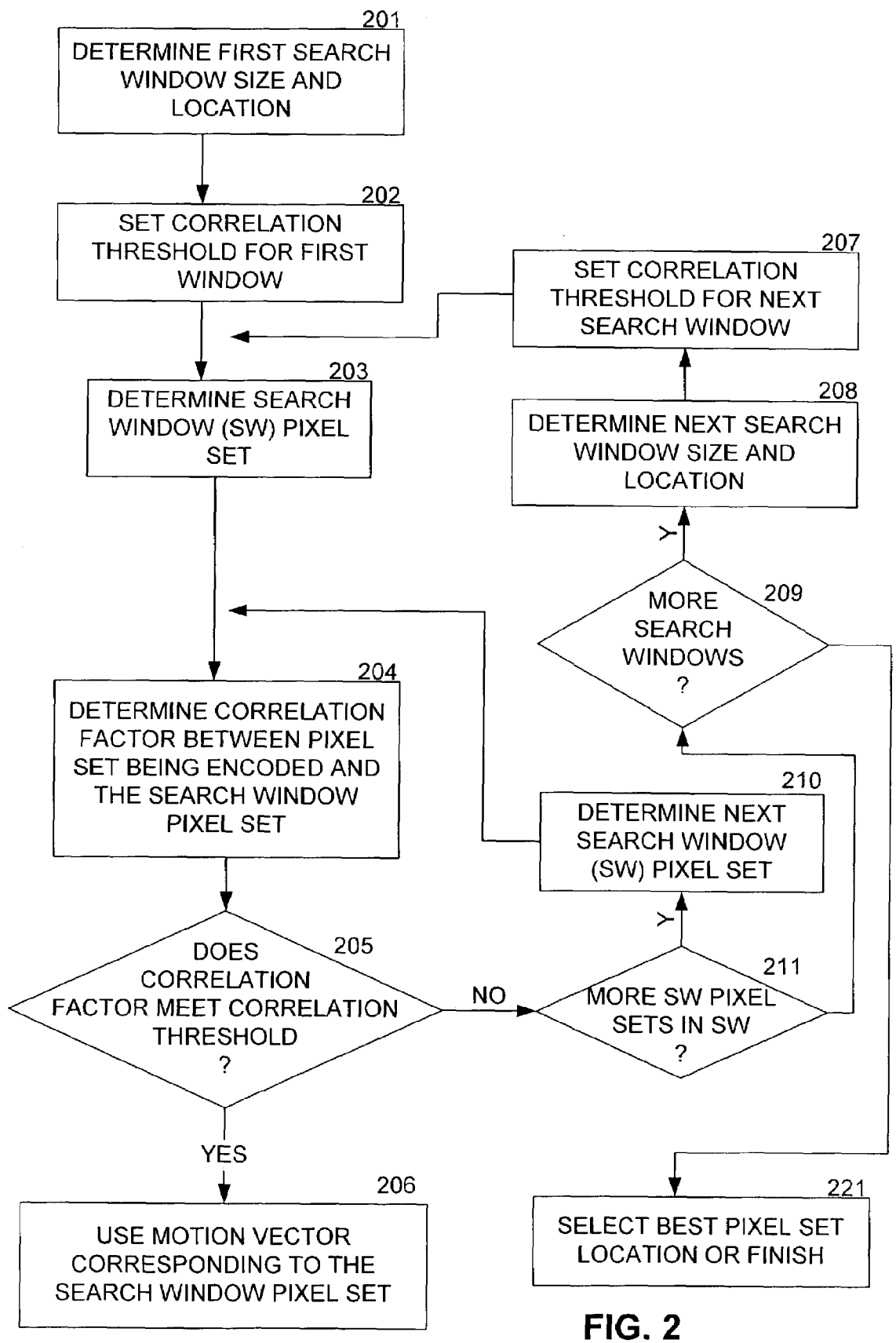
FIG. 2 illustrates, in flow diagram form, a method in accordance with the present disclosure.

At step 202 of FIG. 2, a correlation threshold is set for the first window. As the pixel set being encoded is correlated to the pixel sets of the first window a correlation factor is determined. This correlation factor is compared to the correlation threshold of the first window to determine when a successful match between the pixel sets has been found. Generally, the correlation threshold for the first window would be set relatively high, compared to other correlation thresholds, because the number of pixels sets within the first window is relatively small. Because of the relatively small number pixel sets anticipated within the first window, a somewhat higher correlation factor can be used without affecting performance.

At step 203, a search window pixel set is determined. With respect to FIG. 1 a single search window pixel set may be present. Regardless, one pixel set within the search window will be identified.

At step 204, a correlation factor is determined between the pixel set being encoded and the search window pixel set. The correlation factor can be determined using any of a variety of correlation techniques. Such techniques can be as simple as subtracting one pixel set from the other to determine a difference between the pixel sets. Other techniques can be more complicated. For example, where the pixel set information represents spatial data, the correlation technique can perform a mathematical transform to convert the data to non-spatial pixel set data. For example, sub-sampling techniques and/or techniques that operate on frequency domain data can be used. Furthermore, it will be appreciated, that each application of the step 204, in the loop formed by steps 204-205-211-210, can apply the same correlation technique or different correlation techniques. For example, the first search window location can use a different correlation technique than a subsequent search window.

At step 205, a determination is made whether or not the correlation factor meets the correlation threshold identified in step 202. If the correlation factor does meet the correlation threshold the flow proceeds to step 206 where a motion vector is used corresponding to the search window pixel set. If at step 205 the correlation factor does not meet the correlation threshold, the flow proceeds to step 211. Note that in an embodiment where the current window is to be the last window searched, the correlation threshold can be set so that it will never be met. This would allow the pixel set with the best correlation factor to be selected at step 221.

At step 211 a determination is made whether or not more search window pixel sets exist in the current search window. If so, the flow proceeds to step 210, otherwise the flow proceeds to step 209.

At step 210, a next search window pixel set is determined within the current window. Once the next search window pixel set is determined the flow proceeds to step 204. A loop including steps 204, 205, 211, and 210 continues until all of the search window pixel sets within the current window have been correlated to the pixel set being encoded, or until a successful correlation has occurred.

When no more search window pixel sets exist in the current search window the flow proceeds from step 211 to step 209. At step 209, a determination is made whether or not more search windows are to be identified. If not, the flow proceeds from step 209 to step 221 where the method of FIG. 2 selects the best pixel set location and/or terminates without a successful correlation being found. However, if additional search windows are to be identified, the flow proceeds to step 208.

At step 208, a next search window size and location is determined. Referring to FIG. 1, a search window 112 is the next search window identified.

Step 207, a correlation threshold is set for the next search window 112. Again, with reference to FIG. 1, a new correlation threshold value would be set for the window size 112. Because the window size 112 contains more pixel sets than the search window 111 a less stringent correlation factor will be tolerated. In other words, to avoid a long encode time, a tradeoff in the quality of correlation is allowed.

At step 203, a new search window pixel set is identified. It will be appreciated that where the first search window 111 is a subset of the new search window 112, the correlation factors associated with the pixel sets of the first search window can be maintained, without re-correlating, and compared to the new threshold value. By saving the correlation factors for the first search window only the search window pixel sets that are unique to the second search window 112 would have to be correlated, thereby saving processing time.

Again in the manner previously described, the steps 204, 205, 211, and 210 will be repeated until either all of the search window pixel sets have been correlated against the pixel set being encoded, or a successful pixel set correlation has occurred.

In the manner described, a plurality of search windows, i.e., search windows 111, 112, and 113, can each be searched for pixels sets meeting different correlation threshold values.

In this manner, tradeoffs between picture quality and the amount of processing time expected to be potentially spent can be dynamically maintained. It will be appreciated, that this is an advantage over the prior art, which would identify a single window and a single threshold value.

Figure 3:
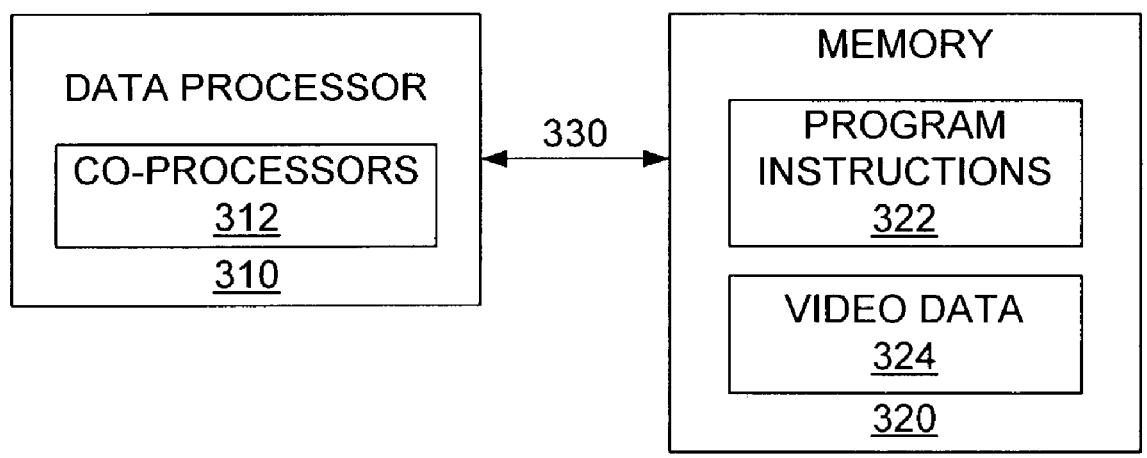
FIG. 3 illustrates, in block diagram form, a system for implementing specific embodiments of the present disclosure.

FIG. 3 illustrates a system in accordance with a specific embodiment of the present disclosure. Specifically, FIG. 3 illustrates a system 300 having a data processor 310, and a memory 320. In operation, the data processor 310 accesses the memory 300 to execute program instructions 322 and to manipulate video data 324. For example, the video data 324 would generally include the video frame data of frames F1 202 and F2 204 of FIG. 1. Likewise, the video processor 310 would generally comprise an instruction execution unit for implementing the instructions. In addition, the data processor 310 can include co-processors 312, which can include specific hardware accelerators and/or microcode engines, capable of implementing some or all of the encoding process described herein. In will be further appreciated, that the information processor 300 of FIG. 3 can be part of a general purpose computer, special purpose computer, or integrated as a portion of a larger system.

In the preceding detailed description of the embodiments, reference has been made to the accompanying drawings which for a part thereof, and in which is shown by way of illustration specific embodiments in which the disclosure may be practiced. These embodiments are described in sufficient detail to enable those skilled in the art to practice the disclosure, and it is to be understood that other embodiments may be utilized and logical, mechanical and electrical changes may be made without departing from the spirit or scope of the present disclosure. To avoid detail not necessary to enable those skilled in the art to practice the disclosure, the description may omit certain information known to those skilled in the art. Furthermore, many other varied embodiments that incorporate the teaching of the disclosure may be easily constructed by those skilled in the art. Accordingly, the present disclosure is not intended to be limited to the specific form set forth herein, but on the contrary, it is intended to cover such alternatives, modifications, and equivalents, as can be reasonably included within the spirit and scope of the disclosure. The preceding detailed description is, therefore, not to be taken in a limiting sense, and the scope of the present disclosure is defined only by the appended claims.

What is claimed is:

1. A method of processing a video signal, the method comprising:
    selecting a first search window of a first frame of video data, the first search window having a first window size;
    determining a first correlation factor between a first set of pixels within the first search window with respect to a second set of pixels in a second frame of video data;
    comparing the first correlation factor to a first threshold value;
    selecting a second search window of the first frame, the second search window having a second window size, the second window size greater than the first window size;
    determining a second correlation factor between a third set of pixels within the second search window with respect to the second set of pixels;
    comparing the second correlation factor to a second threshold value, the second threshold value being different than the first threshold value;
    selecting a third search window of the first frame, the third search window having a third window size, the third window size greater than the second window size;

determining a third correlation factor between a fourth set of pixels within the third search window with respect to the second set of pixels; and comparing the third correlation factor to a third threshold having a third correlation threshold value, the third correlation threshold value being different than the second correlation threshold value and different than the first correlation threshold value.

2. The method of claim 1, wherein selecting the second search window comprises the first set of pixels being within the second search window.

3. The method of claim 1, further comprising determining a motion vector based on at least one of the pixels within at least one of the third set of pixels and fourth set of pixels.

4. The method of claim 1, further comprising:
saving the first correlation factor; and
comparing the first correlation factor to the second threshold value.

5. The method of claim 4, wherein comparing the first correlation factor to the second threshold value occurs before comparing the second correlation factor to the second threshold value.

6. The method of claim 1, wherein determining the first correlation factor comprises determining the first correlation factor based on a first correlation technique and determining the second correlation factor comprises determining the second correlation factor based on a second correlation technique different than the first correlation technique.

7. The method of claim 1, wherein determining the first correlation factor comprises determining the first correlation factor based on a first correlation technique, determining the second correlation factor comprises determining the second correlation factor based on the first correlation technique.

8. The method of claim 1 further comprising:
when the fourth set of pixels has a best correlation factor of sets of pixels in the third search window, identifying the fourth set of pixels as a set of pixels with the best correlation factor in the third window.

9. A method of determining a motion vector for a pixel set being encoded comprising:
selecting a first search window of a first frame of video data, the first search window having a first window size;
determining if any pixel set associated with the first search window meets a first correlation requirement with respect to the pixel set being encoded;
determining a motion vector for the pixel set being encoded when any pixel set associated the first search window meets the first correlation requirement; and
when no pixel set associated the first search window meets the first correlation requirement:
selecting a second search window of the first frame of video data, the second search window having a second window size larger than the first window size;
determining if any pixel set associated with the first search window meets a second correlation requirement with respect to the pixel set being encoded, the second correlation requirement being different than the first correlation requirement; and
determining a motion vector for the pixel set being encoded when any pixel set associated the second search window meets the second correlation requirement.

10. The method of claim 9, wherein the second correlation requirement is less stringent than the first correlation requirement.

11. A method comprising:
selecting a first search window having a first window size for a first frame of video data;
determining a first correlation factor between a first set of pixels within the first search window with respect to a second set of pixels in a second frame of video data;
in response to determining that the first correlation factor does not meet a first threshold:
selecting a second search window having a second window size greater than the first window size for the first frame; and
determining a second correlation factor between a third set of pixels within the second search window with respect to the second set of pixels.

12. The method of claim 11, further comprising:
determining a motion vector for the second set of pixels based on the third set of pixels in response to determining that the second correlation factor meets a second threshold.

13. The method of claim 11, further comprising:
in response to determining that the second correlation factor does not meet a second threshold:
selecting a third search window having a third window size greater than the second window size for the first frame; and
determining a third correlation factor between a fourth set of pixels within the second search window with respect to the second set of pixels.

14. The method of claim 13, further comprising:
determining a motion vector for the second set of pixels based on the fourth set of pixels in response to determining that the third correlation factor meets a second threshold.

15. The method of claim 11, wherein determining the first correlation factor comprises determining the first correlation factor based on a first correlation technique wherein determining the second correlation factor comprises determining the second correlation factor based on a second correlation technique different than the first correlation technique.

16. A system comprising:
a video data processing element;
a memory coupled to the video data processing element, the memory comprising:
a video data storage region to store a first frame of video data and a second frame of video data; and
a program storage region to store program instructions, the program instructions to manipulate the video data processing element to:
select a first search window having a first window size for the first frame;
determine a first correlation factor between a first set of pixels within the first search window with respect to a second set of pixels in the second frame; and
in response to determining that the first correlation factor does not meet a first threshold:
select a second search window having a second window size greater than the first window size for the first frame; and
determine a second correlation factor between a third set of pixels within the second search window with respect to the second set of pixels.

17. The system of claim 16, wherein the program instructions are to manipulate the video data processing element to:
determine a motion vector for the second set of pixels based on the third set of pixels in response to determining that the second correlation factor meets a second threshold.

18. The system of claim 16, wherein the program instructions are to manipulate the video data processing element to:
in response to determining that the second correlation factor does not meet a second threshold:
select a third search window having a third window size greater than the second window size for the first frame; and
determine a third correlation factor between a fourth set of pixels within the second search window with respect to the second set of pixels.

19. The system of claim 18, wherein the program instructions are to manipulate the video data processing element to:
determine a motion vector for the second set of pixels based on the fourth set of pixels in response to determining that the third correlation factor meets a second threshold.

20. The system of claim 16, wherein:
the program instructions to manipulate the video data processing element to determine the first correlation factor comprise program instruction to manipulate the video data processing element to determine the first correlation factor based on a first correlation technique; and
the program instructions to manipulate the video data processing element to determine the second correlation factor comprise program instruction to manipulate the video data processing element to determine the second correlation factor based on a second correlation technique different than the first correlation technique.

* * * * *

UNITED STATES PATENT AND TRADEMARK OFFICE
CERTIFICATE OF CORRECTION

PATENT NO. : 7,408,989 B2 Page 1 of 1
APPLICATION NO. : 10/345847
DATED : August 5, 2008
INVENTOR(S) : Patrick Rault and Zhihua Zeng It is certified that error appears in the above-identified patent and that said Letters Patent is hereby corrected as shown below:

Cover page, line item (73), change Assignee name "ViX5 Systems Inc" to --ViXS Systems Inc--

Signed and Sealed this

Seventh Day of September, 2010

David J. Kappos
*Director of the United States Patent and Trademark Office*